United States Patent
McBroom

[11] Patent Number: 6,149,749
[45] Date of Patent: Nov. 21, 2000

[54] REPAIR OF COMPOSITE LAMINATES

[75] Inventor: Geoffrey McBroom, Clevedon, United Kingdom

[73] Assignee: British Aerospace Public Limited Company, Farnborough, United Kingdom

[21] Appl. No.: 08/959,725

[22] Filed: Oct. 28, 1997

[30] Foreign Application Priority Data

Nov. 1, 1996 [GB] United Kingdom .................. 9622780

[51] Int. Cl.$^7$ ........................... B29C 73/10; B29C 73/30
[52] U.S. Cl. .......................... 156/94; 29/402.09; 156/98; 156/87; 425/11; 425/14; 428/137
[58] Field of Search ................... 156/94, 98, 87; 425/11, 14; 29/402.09, 402.11; 428/63, 137; 206/582

[56] References Cited

U.S. PATENT DOCUMENTS

| | | |
|---|---|---|
| 3,798,690 | 3/1974 | Moore . |
| 4,528,230 | 7/1985 | Larson ..................................... 428/137 |
| 4,554,036 | 11/1985 | Newsom .................................. 156/94 |
| 4,800,054 | 1/1989 | Roestenberg ............................. 425/11 |
| 4,817,538 | 4/1989 | Michaelsen . |
| 5,374,388 | 12/1994 | Frailey ..................................... 156/94 |
| 5,620,768 | 4/1997 | Hoffmann ................................ 428/63 |
| 5,868,886 | 2/1999 | Alston ...................................... 156/98 |

OTHER PUBLICATIONS

Klein, Allen J., ed., "Repair of Composites", Advanced Composites, Jul./Aug. 1987.
Heimerdinger et al., "Repair Technology for Thermoplastic Aircraft Structures", Advisory Group for Aerospace Development, Acard, Seville, Spain, Oct. 1994.

*Primary Examiner*—Daniel Stemmer
*Attorney, Agent, or Firm*—Kenyon & Kenyon

[57] ABSTRACT

A patch of fibre reinforced plastics composite material, a repair kit including such a patch and a method of using such a patch and repair kit are provided. The patch (1) is for attachment to a surface (17) of a fibre reinforced plastics composite structure (11) over an area of damage (10) to the structure. The patch defines an outer surface (3), a bonding surface (4) opposed thereto and a peripheral edge. The patch includes fibre reinforcement and plastics matrix material with the latter being in a final state of hardness. The patch defines a series of small apertures (6) therethrough to allow the passage of gases and other matter through the patch to prevent entrapped air weakening the repair.

22 Claims, 3 Drawing Sheets

REPAIR OF COMPOSITE LAMINATES

BACKGROUND TO THE INVENTION

This invention relates to the repair of composite structures and in particular to the repair of such structures by the adhesion of a patch of composite material over a damage crater in a surface of the structure. Such repairs find particular applicability in the repair of composite structures defining aerodynamic surfaces of aircraft.

DESCRIPTION OF THE PRIOR ART

It is well known to effect permanent patch repairs to damaged fiber reinforced plastics composite structures such as aircraft fairings, ailerons, airbrakes, flaps and sometimes wing primary structures. Such structures are invariably laminates and are often sandwich reinforced structures comprising two spaced monolithic laminates separated by a lightweight structure such as honeycomb paper or fiber.

When damage occurs to such structures, for example by impacted damage from a flying stone or other debris or from a dropped tool, a damage crater will be formed in the laminate struck by the object concerned. In the case of a sandwich reinforced structure such a crater may extend right through the first laminate and into the central reinforcement of honeycomb or the like.

Repairs to such composite structures generally entail a lightweight composite filler material being inserted into the crater in a thixotropic state to stand slightly proud of the outer surface. The filler is then allowed to harden and cure. It is then abraided flush with the surface of the structure. A patch of fiber reinforced composite material in either cured or more generally uncured state is then adhered to the surface of the structure over the filled crater using a separate adhesive and the patch is then bonded in position using both vacuum and heat. The vacuum is normally applied using an airtight sheet of material placed over the repair and temporarily sealed to the structure using a bead of adhesive around its periphery. A vacuum is then created under the sheet to try to ensure that any air bubbles are expelled from underneath the patch and to ensure good bonding. At the same time a heater blanket positioned inside or outside the vacuum bag will apply heat to the repair to effect hardening and curing of the adhesive which is normally a curable resin.

Such repairs can take anything from approximately four hours upwards to complete, mainly due to the time necessary to allow curing of the filler and adhesive. In addition, despite the use of vacuum equipment to attempt to expel all air entrapped under the patch, the complete absence of such entrapment cannot be guaranteed and non-destructive testing may need to be carried out to ensure the structural integrity of the repair.

It is an object of the invention to provide a patch and method for permanently repairing a composite structure using such a patch which will overcome the difficulties of the prior art.

SUMMARY OF THE INVENTION

According to a first aspect of the invention there is provided a patch of fiber reinforced plastics composite material for attachment to a surface of a fiber reinforced plastics composite structure over an area of damage to the structure, the patch defining an outer surface, a bonding surface opposed thereto and a peripheral edge, the patch including fiber reinforcement and plastics matrix material and the plastics matrix material being in a substantially final state of hardness, wherein the patch defines a series of apertures therethrough to allow the passage of matter through the apertures during bonding of the patch to the structure.

The series of apertures defined through the patch have been found to ensure the substantially total removal of entrapped gases beneath the patch which not only obviates the need for non-destructive testing of the repair but enables patches of unlimited size to be applied to repairs in the secure knowledge that the size of the repair has no bearing on the possibility of gas entrapment underneath the patch.

The apertures may be defined at positions spaced substantially across the entire area of the patch, conveniently in a grid formation.

At least one said aperture may be greater than substantially 0.01 mm and less than substantially 2 mm in diameter and preferably greater than substantially 0.05 mm and less than substantially 1.0 mm in diameter and more preferably greater than substantially 0.05 mm and less than substantially 0.1 mm in diameter.

Such holes may conveniently be formed in a patch by laser drilling.

Where the apertures are small in diameter the pitching of apertures from one another may be correspondingly small.

The patch may conveniently include a final protective coating applied to the outer surface thereof.

The patch may be formed to a predetermined curvature for repairing curved structures. Patches may be formed to a series of curvatures intermediate known curvatures of surfaces to be repaired whereby some flexing of the patch during application to the surface to be repaired will enable a matching curvature to be achieved between patch and surface with a limited range of patches kept in stock.

The patch may include a perforated film adhered to the outer surface thereof wherein the film may include at least one area extending beyond the edge of the patch for location of the patch with respect to the structure during bonding. The perforated film may be adhesive film and the at least one area may comprise a series of ears for adhesive attachment in relation to a surface of the structure to be repaired, eg for attachment to the surface of the structure itself or to a further protective film applied to the surface around the crater.

According to a second aspect of the invention there is provided a repair kit for repairing a damaged area of a fiber reinforced plastics composite structure, the kit including a patch according to the first aspect of the invention contained in an envelope comprising a sheet of airtight material for use as a vacuum bag when effecting the repair and a removable cover layer sealeably attached to the sheet of airtight material.

The kit according to the invention thus conveniently offers a neat, air- and dust-tight envelope for simple application to a repair site without the need to separately keep and apply a number of elements to effect the repair.

A sheet of airtight material may be sealably attached to the removable cover layer by a bead of adhesive for use in sealing the vacuum bag to the structure to effect the repair.

The repair kit may include a layer of breather cloth interposed between the patch and the sheet of airtight material and may include at least one layer of perforated film interposed between the sheet of airtight material and the patch.

According to a third aspect of the invention there is provided a method of repairing damage to a fiber reinforced plastics composite structure, the structure including at least a monolithic laminate and the damage including a crater at least in the said laminate which crater extends from a surface of the laminate to be repaired into the laminate, the method including the steps of:

applying to surfaces to be bonded and introducing into the crater liquid adhesive;

levelling off the adhesive to stand slightly proud of the said surface whilst substantially filling the crater;

applying a patch according to the first aspect of the invention to the said surface so as to cover the crater, and extracting any excess adhesive and gas from beneath the patch through the apertures in the patch and hardening the adhesive to bond the patch in position and complete the repair.

The method of the invention thus enables the use of the patch according to the first aspect of the invention in a manner which avoids the use of a separate filler material which must be separately hardened and abraded flush with the surface to be repaired prior to the application of the patch thereto with, again, a separate adhesive. Overall time savings for repairs according to the method of the invention are expected to be at least three hours over prior art methods. With aircraft downtime often running at $US100,000.00 per hour it will be appreciated that enormous potential savings are possible when employing the method of the invention.

The liquid adhesive is preferably thixotropic to enable repairs at any orientation. Solid inclusions may be introduced into the liquid adhesive. These may be sized such that their presence individually between the patch and the surface of the structure may be easily detected by an operator effecting the repair. The unwanted presence of such inclusions along the bond line is thus avoided.

The purpose of the solid inclusions is to give a degree of compressibility to the adhesive, to help to avoid fire from an exothermic reaction which can take place upon resin cure, and also to save weight. The flexibility or elasticity can help avoid the occurrence of cracks at a boundary between the resin and the structure being repaired. Such boundary may occur at an interface with a monolithic said laminate or at an interface with sandwich reinforcement material, for example paper or other fiber.

It is desirable that such solid inclusions have a curved outer surface whereby to engage the adhesive all around for enhanced bonding.

The solid inclusions may be somewhat elastic in nature but are more preferably capable of crumbling upon the application of pressure thereto. Rohacel (registered trade mark) is a material having suitable properties.

Hence the method may include selecting at least some of the solid inclusions so as to make a volume of liquid adhesive contained by the crater and patch slightly compressible.

The step of hardening the adhesive may include raising the temperature thereof to a temperature less than substantially 100° C. Where a curable resin is being used as an adhesive, the restriction of upper temperature to less than the boiling point of water avoids the generation of steam which may permeate along the joint line and reduce adhesion between the patch and structure. It will be appreciated that resin cure temperature could be as high as 180° C., but repairs in the field are likely to be more sound if a lower curing temperature resin is used to avoid the possibility of steam as aforesaid.

Where the adhesive is a curable resin the method may include the step of curing the adhesive for a period less than substantially one hour. Such a short curing time can dramatically shorten the overall repair time according to the method of the invention.

The introduction of solid inclusions into the adhesive may include introducing microfibers into the adhesive. Random distribution of such microfibres can greatly enhance the cured structural qualities of the portion of the adhesive used to fill the damage crater.

A protective film may be applied to the surface of the structure to be repaired around an area of the surface to be covered by the patch prior to applying the patch.

The protective film may be centralised and oriented with respect to the crater when applying same to the surface and alignment marks may be applied to the protective film and to an outer surface associated with the patch, ie either to the patch itself or to an outer surface of a vacuum bag of a kit in which the patch is included. The said marks on the patch or kit and protective film may then be aligned with each other when applying the patch to the surface of the structure in order accurately to locate the patch with respect to the crater. This ensures a structurally sound repair without having to use an excessively large patch.

A solid support may be introduced into the crater to provide support for the patch during application thereof over the crater and during hardening of the adhesive. This will ensure that the patch does not distort out of shape from a shape following the contour of the surface being repaired. Such distortion can cause unacceptable structural weakness, particularly in compression of aircraft skins. When effecting a large repair for example the patch may comprise at least one pillar introduced into the adhesive in the crater such that one end of the pillar contacts a base of the crater and the other end contacts the patch when applied so as to support the patch in a desired relationship with the surface being repaired, The pillar may conveniently comprise glass or carbon fiber composite or a carbon fiber rod. Its length may be trimmed according to need.

The structure being repaired may be a sandwich-stiffened structure having a pair of spaced monolithic laminates separated by a cellular structure, for example honeycomb, sandwiched therebetween. A pillar used in the repair might then extend below the base of the crater and abut an interior surface of that monolithic laminate spaced from the damage.

Manufacture of the patch according to the invention may include first curing the patch, when employing curable resin, then painting an outer surface of the patch and subsequently drilling, for example laser drilling the apertures in the patch.

The patch may be preformed to a predetermined curvature before curing of the resin. Such a curvature may be intermediate different curvatures to which a given patch will be applied, for example the curvature of a leading edge of an aircraft wing.

The patch may be of any required thickness and any suitable number of plies in order to give the required structural strength in the particular circumstances.

It will be appreciated that when carrying out the repair method of the invention all the normal preparatory work may be done to the damaged area in the usual way, for example thorough drying thereof, abrasion and cleaning of the surface to be repaired and debris and sharp edge removal.

Best results for the repair are likely to be obtained when the liquid adhesive is painted onto all contact areas with a brush or the like to ensure good adhesion.

In circumstances where a thermoplastic patch is employed a curable resin may still be used as an adhesive, according to the invention.

When extracting any excess adhesive and/or gas from beneath the patch through the apertures in the patch, a vacuum applied underneath a vacuum bag sealably attached to the surface may conveniently be employed. A vacuum of up to say 75% full vacuum is considered satisfactory for the method of the invention. The patch of the invention will cause the apertures to be self-sealed flush with the outer surface of the patch when the adhesive hardens, and in particular when a protective film is removed from the outer surface.

BRIEF DESCRIPTION OF THE DRAWINGS

The invention will now be described by way of example with reference to the accompanying drawings of which.

DESCRIPTION OF PREFERRED EMBODIMENT

Figure 1:
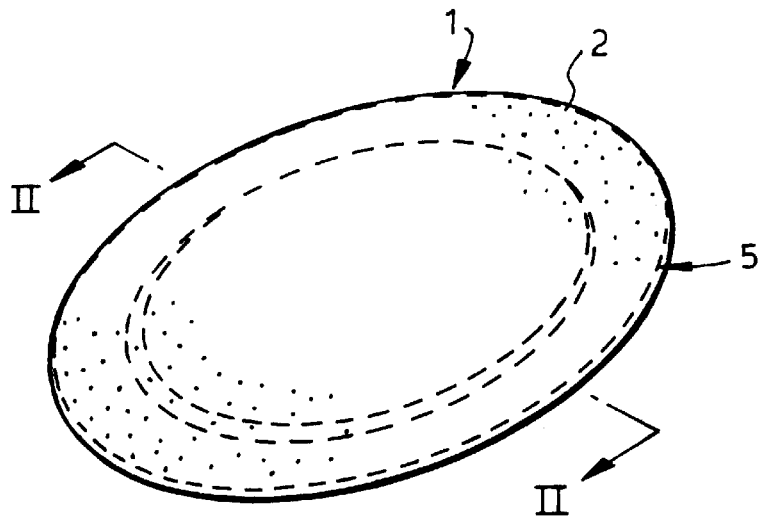
FIG. 1 is an upper three-quarter view of a patch according to the invention.

Referring to FIGS. 1, 2, 3 and 4 of the drawings, a patch 1 according to the invention is shown. The patch has a peel-off protective plastic film 2 in contact with an outer surface 3 thereof, an opposed bonding surface 4 and a peripheral edge 5. The patch is perforated by a series of apertures 6 defined therethrough to allow the passage of gases and/or excess resin during effecting of a repair. It will be noted, from FIG. 2, that the plastic protective film 2 is shown schematically as perforated along with the patch whereby to allow gases and other matter to pass therethrough when passing through the patch. The patch has a final protective coating in the form of a layer of paint 7, see FIG. 2, which is similarly perforated when the patch is perforated. The act of perforation is carried out using a laser drilling technique and the apertures in the patch are between 0.05 mm and 0.1 mm in diameter. It is be observed from FIG. 2 that the apertures are spaced substantially across the entire area of the patch.

Figure 2:
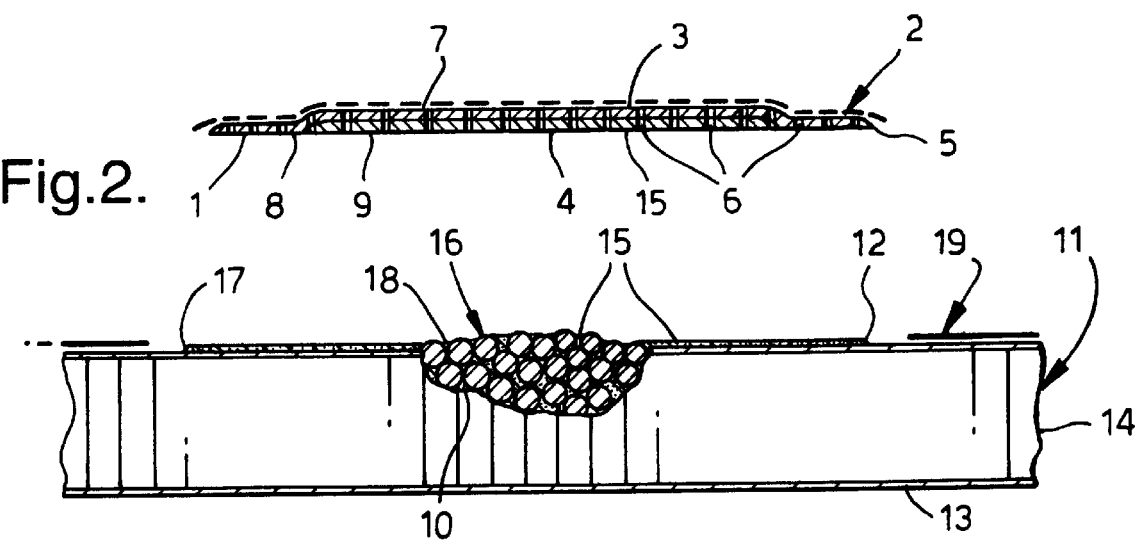
FIG. 2 is a section taken along the line II—II of FIG. 1, together with a section through a sandwich-reinforced laminate structure to be repaired.

It can also be seen from FIG. 2 that the patch 1 has two plies 8, 9 co-cured together and laser drilled together.

Figure 3:
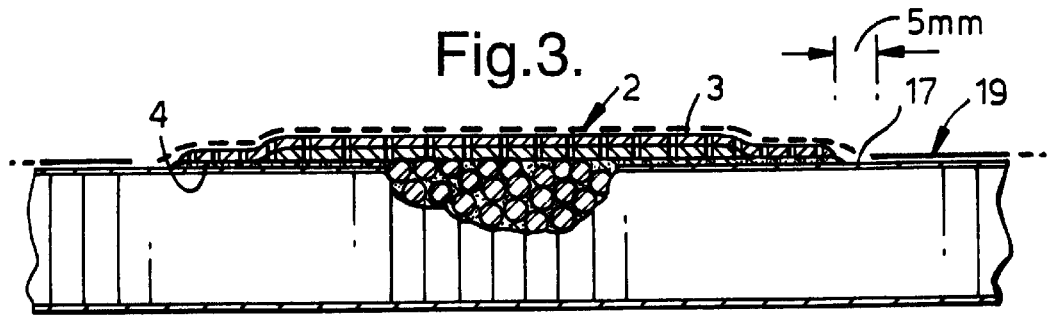
FIG. 3 is a view of the components of FIG. 2 with the patch bonded in position to repair the sandwich-reinforced laminate structure.

FIGS. 2 and 3 illustrate the application of a patch 1 according to the invention to a sandwich-reinforced carbon fiber composite laminate structure having a damage crater 10. The structure 11 has a pair of spaced monolithic carbon fiber laminates 12, 13. The laminates 12, 13 are separated by a fiber honeycomb structure 14. It will be observed that the damage crater extends through the laminate 12 into the honeycomb structure 14.

The crater 10 is first prepared for repair by the removal of any rough edges and non-structural loose material by abrading and by the use of suction means. The cleaned and prepared crater is then dried by conventional means. A mix of liquid adhesive 15 is then prepared from a fast curing resin. Into the adhesive 15 is introduced Rohacel spheres 16 of approximately 3 mm average diameter. Sufficient spheres 16 are introduced to substantially fill a volume enclosing the adhesive, with the liquid adhesive 15 filling in the gaps between adjacent touching spheres. In this way a lightweight mix with a degree of compressibility is formed.

The crater walls and all other surfaces to be bonded are then brushed with the liquid adhesive 15 before the introduction of the mix containing the spheres 16 into the crater. It will be observed from FIG. 2 that the mix is introduced into the crater until it is slightly proud of a surface 17 to be repaired of the structure 11. For additional strength the mix of liquid adhesive 15 contains microfibres is dispersed throughout for additional structural strength of the resin, once cured.

Figure 4:
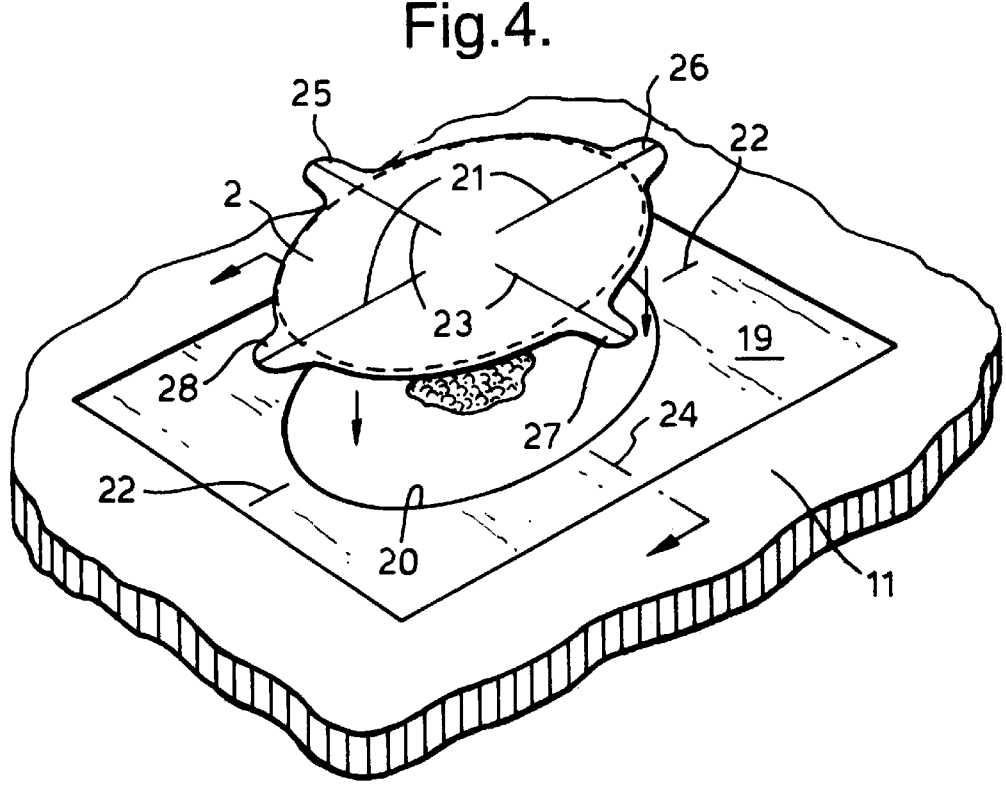
FIG. 4 is an isometric view of a patch similar to that shown in FIG. 1 ready to be placed in position on a structure to be repaired.

The surface 17 of the structure is protected over an area surrounding the area to receive the patch 1 with a layer of protective film 19, see FIGS. 2, 3, and 4. The protective film 19 is centralised and orientated with respect to the crater when applied and defines an oval aperture 20 therein some 5 mm greater in measurement thereacross than the corresponding dimension of the patch, see FIG. 3. It will be observed, from FIG. 4, that both the protective film 19 and the peel-off protective film 2 exhibit alignment markings 21, 22 in a longitudinal direction and 23, 24 in a transverse direction. Alignment of these marks during placement of the patch over the crater considerably simplifies the accurate placement of the patch to ensure optimum structural strength of the repair.

It will be observed that the peel-off protective film 2, as shown in FIG. 4, has adhesive ears 25, 26, 27, 28 for secure location of the patch 1 with respect to the structure 11 during cure of the resin adhesive. The protective films 2 and 19 are of course peeled off the patch and surface 17 and discarded once the patch is cured in position.

Figure 5:
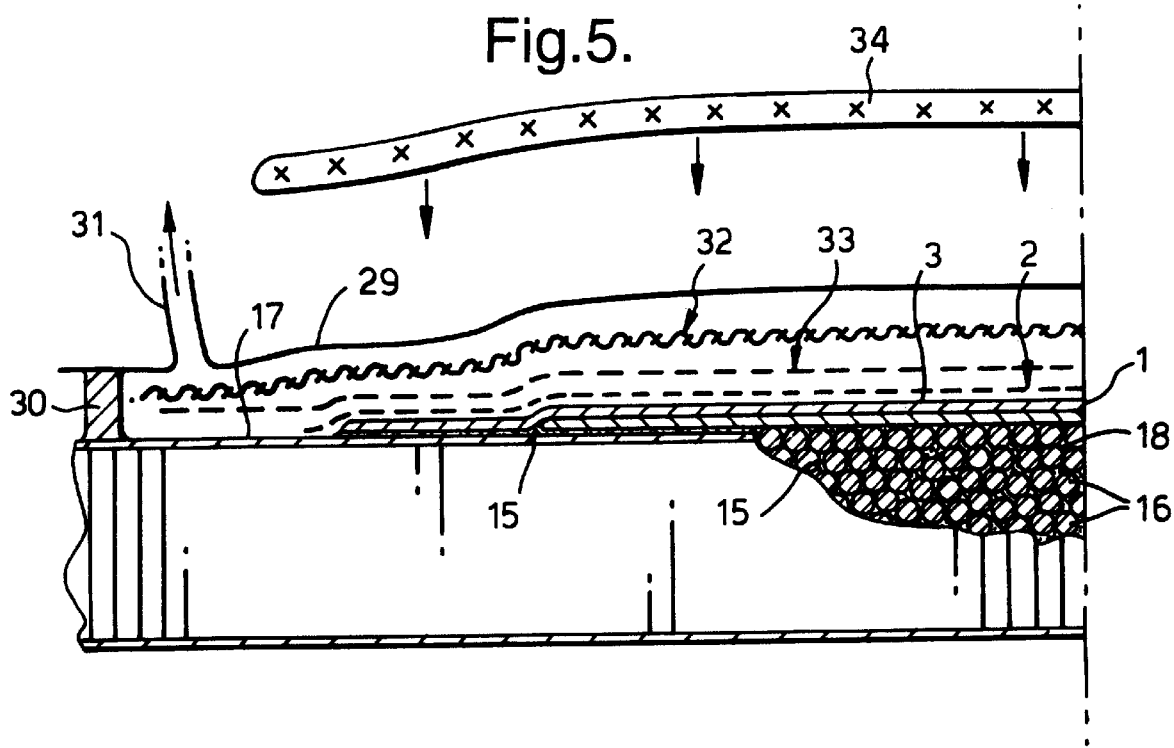
FIG. 5 is a section taken through a damaged structure and repair kit according to the invention.

Returning to FIGS. 2 and 3, liquid adhesive 15 is evenly spread over the bonding surface 4 of the patch and that part of the surface 17 of the structure to which the patch will be bonded, the patch 1 is then firmly pressed into position over the crater 10, as shown in FIG. 3, and also in FIG. 5 so that a continuous bond area is formed between patch and structure, as shown in FIG. 5. It will be observed from FIG. 5 that the Rohacel spheres 16 are clearly too large to migrate between the patch and surface 17 of the structure without being easily detected by an operator applying the patch.

Once the operator is satisfied that the patch has been correctly positioned, heating and vacuum application means may be applied to effect curing of the adhesive and compression of the repair to extract any unwanted gases or excess adhesive from beneath the patch.

Figure 6:
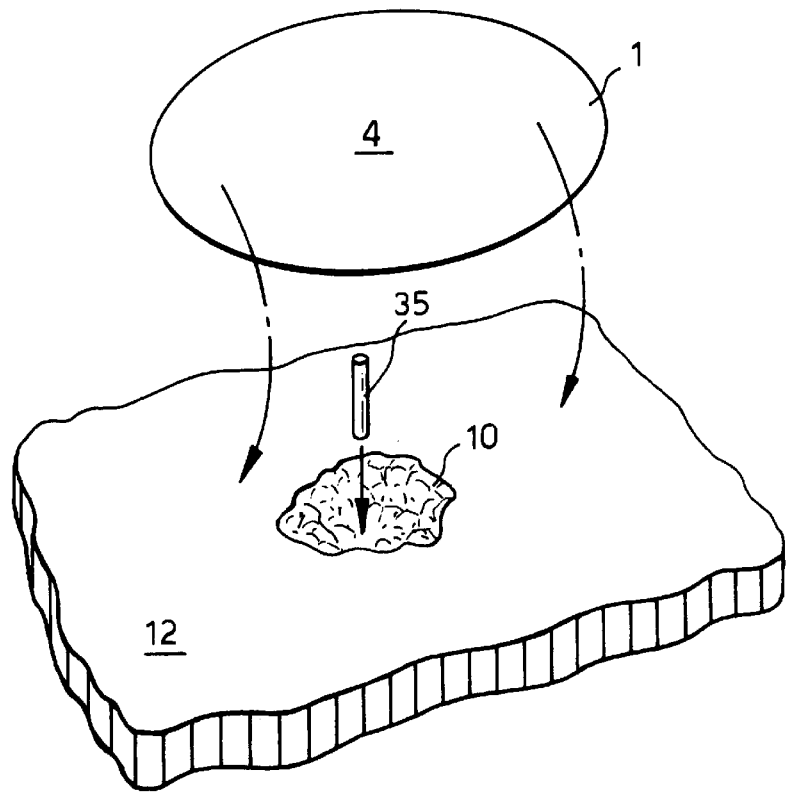
FIG. 6 is an isometric exploded view of a structure and patch with repair pillar according to the invention.
Figure 7:
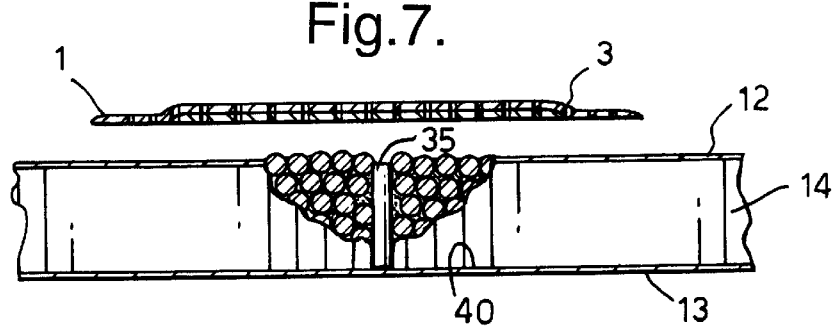
FIG. 7 shows in section the elements of FIG. 6.

Referring to FIG. 5, a vacuum bag 29 is shown in place over the repair, sealed thereto by a bead of gummy adhesive 30. Suction is applied as indicated via a tube 31 for connection to a vacuum source (not shown). Within the vacuum bag 29 is to be found a layer of porous breather cloth 32 to transmit any gases from any part of the assembly to the suction tube 31. Beneath the breather cloth 32 is a perforated non-stick bleed film 33 and beneath these are the protective film 2 and the patch 1. Above the assembly is shown a heater blanket 34 for applying heat to the repair to effect curing of the resin. Gases and air bubbles beneath the patch 1 escape therefrom through the apertures (not shown in FIG. 5) formed in the patch 1 and also through the apertures in the protective film 2 over the patch. In addition, any excess resin has been found to migrate through the apertures in the patch with equal ease which can then be absorbed by the breather cloth 32. It will be appreciated that the invention provides a method of repairing damaged areas of composite laminate structures of unlimited size owing to the ability of the porous patch of the invention to allow transmission of gases and excess adhesive therethrough in whatever quantities are required. In this connection it will be observed that the filling of the crater beneath the patch by the Rohacel spheres 16 conveniently supports the patch during application of the vaccum and prevents undue sagging of the patch into the crater. In the case of exceptionally large repairs an arrangement as shown in FIGS. 6 and 7 can be used whereby a pillar 35, made of glass-reinforced plastics here, may be positioned in the crater 10 so as to support the patch during curing. The pillar 35 penetrates the honeycomb structure 14 to abut the interior surface 40 of the laminate 13 and support the patch during cure of the resin.

During curing of the repair heat of approximately 90° C. and 75% vacuum are applied for between 15 minutes and one hour depending upon the particular circumstances of the repair to fully cure the resin adhesive both within the crater and between the bonding surface 4 of the patch and the surface to be repaired 17 of the structure. This simultaneous curing available with the method of the invention is a key element in the shortening of the time required to carry out such structural repairs to composite laminates.

Figure 8:
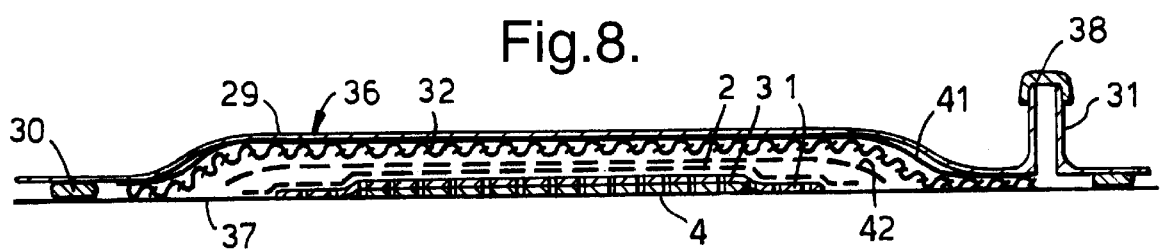
FIG. 8 is a sectional view of a repair kit according to the invention.

FIG. 8 illustrates in section a repair kit 36 according to the invention. The elements shown correspond to those illustrated in FIG. 5 save for the addition of an airtight closing film 37 secured in position by the gummy adhesive 30 and of two layers of two-sided adhesive mesh 41, 42 between the vacuum bag 29 and breather cloth 32 and the breather cloth 32 and protective film 2, respectively. These layers of mesh keep the elements of the kit in register to ensure accurate location of the patch with respect to the crater when the whole kit is placed over the crater. The ears 25, 26, 27, 28 will not be necessary when the kit is used. The kit is fully atmospherically sealed by the addition of a cap 38 secured in position over the suction tube 31 of the vacuum bag 29.

When it is required to effect a repair using the kit of the invention the closing film 37 is peeled away from the gummy adhesive 30 to reveal the patch 1 ready for the application of liquid adhesive to the bonding surfaces 4 and 17 thereof. The patch 1 is then applied to the area to be repaired, alternatively the complete kit 36 is applied to the repair area with the patch registered in position within the kit. In these circumstances location marks are suitably provided on the vacuum bag 29 to assist in locating the kit accurately with respect to the crater. During application of the kit to the surface 17 of the structure to be repaired the gummy adhesive 30 is sealably connected to the surface 17 to create an airtight seal for the application of vacuum within the vacuum bag through the tube 31. Thereafter the repair is effected as described above in relation to FIG. 5.

It will thus be appreciated that the patch, repair kit and method of the invention provide a neat and extremely effective means of carrying out structurally sound repairs to composite structures in a fraction of the time previously possible using prior art methods.

What is claimed is:

1. A patch of fiber reinforced plastics composite material for attachment to a surface of a fiber reinforced plastics composite structure over an area of damage to the structure, said patch defining an outer surface, a bonding surface opposed thereto and a peripheral edge, said patch including fiber reinforcement and plastics matrix material and said plastics matrix material being in a substantially final state of hardness, wherein said patch defines a series of apertures therethrough to allow the passage of matter therethrough during bonding of said patch to the structure, and said patch includes a perforated film adhered to said outer surface.

2. A patch as in claim 1 in which said apertures are defined at positions spaced substantially across the entire area of said patch.

3. A patch as in claim 1 in which at least one said aperture is greater than substantially 0.01 mm and less than substantially 2 mm in diameter.

4. A patch as in claim 3 in which at least one said aperture is greater than substantially 0.05 mm and less than substantially 1.0 mm in diameter.

5. A patch as in claim 4 in which at least one said aperture is greater than substantially 0.05 mm and less than substantially 0.1 mm diameter.

6. A patch as in claim 1 including a final protective coating applied to said outer surface thereof.

7. A patch as in claim 1 formed to a predetermined curvature for repairing curved structures.

8. A patch as in claim 1, wherein said perforated film includes at least one area extending beyond said peripheral edge of said patch for location of said patch with respect to the structure during bonding.

9. A patch as in claim 8 in which said perforated film is adhesive film and said at least one area comprises a series of ears for adhesive attachment in relation to a surface of the structure to be repaired.

10. A method of repairing an area of damage to a surface of a fiber reinforced plastics composite structure with a patch, said structure including at least a monolithic laminate and said area of damage including a crater in at least in said laminate, said patch is made of fiber reinforced plastics composite material for attachment to said surface of said fiber reinforced plastics composite structure over said area of damage to the structure, said patch defining an outer surface, a bonding surface opposed thereto and a peripheral edge, said patch including fiber reinforcement and plastics matrix material, said plastics matrix material being in a substantially final state of hardness, said patch defines a series of apertures therethrough to allow the passage of matter therethrough during bonding of said patch to the structure, the method including the steps of:

applying to surfaces to be bonded and introducing into said crater liquid adhesive;

leveling off said adhesive to stand slightly proud of said surface of said structure whilst substantially filling said crater;

applying said patch to said surface so as to cover said crater; and extracting any excess adhesive and gas from beneath said patch through said apertures in said patch and hardening said adhesive to bond said patch in position and complete the repair.

11. A method as in claim 10 including the step of introducing solid inclusions into said liquid adhesive.

12. A method as in claim 11 including sizing at least some of said solid inclusions 50 that their presence individually between said patch and surface of said structure may be easily detected by an operator effecting the repair.

13. A method as in claim 11 including selecting at least some of said solid inclusions so as to make a volume of liquid adhesive contained by said crater and patch slightly compressible.

14. A method as in claim 10 in which the step of hardening said adhesive includes raising the temperature thereof to a temperature less than about 100° C.

15. A method as in claim 10 in which said adhesive is a curable resin including the step of curing said adhesive for a period less than about one hour.

16. A method as in claim 10 including the step of applying a protective film to said surface of said structure to be repaired around an area of said surface to be covered by said patch prior to applying said patch.

17. A method as in claim 16 including the step of centralising said protective film and orienting same with respect to said crater when applying said film.

18. A method as claim 17 including the steps of applying alignment marks to said protective film and an outer surface associated with said patch and aligning said marks on said outer surface with said marks on said protective film when applying said patch to said surface of said structure.

19. A method as in claim 11 in which the step of introducing solid inclusions into said adhesive includes introducing microfibers into said adhesive.

20. A method as in claim 10 including the step of introducing a solid support into said crater to provide support for said patch during application thereof over said crater and during hardening of said adhesive.

21. A method as in claim 10 in which said structure being repaired is a sandwich-stiffened structure having a pair of spaced monolithic laminates separated by a cellular structure sandwiched therebetween.

22. A method as in claim 21 in which the step of introducing said solid support into said crater includes introducing a pillar into said adhesive in said crater such that one end of said pillar abuts an interior surface of that monolithic laminate spaced from the damage and the other end contacts said patch when applied so as to support said patch in a desired relationship with said surface being repaired.

* * * * *